March 5, 1963  W. RÖSLER  3,079,946
EXCESS PRESSURE VALVE
Filed Feb. 29, 1960
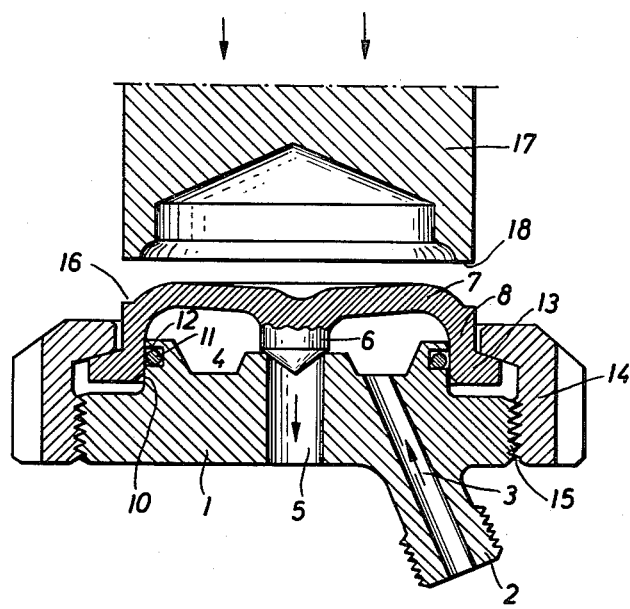
INVENTOR
WULFF RÖSLER
BY
Burgess, Dinklage + Sprung
ATTORNEYS

3,079,946
EXCESS PRESSURE VALVE
Wulff Rösler, Altlunen, Germany, assignor to Gewerkschaft Eisenhutte Westfalia, Wethmar, near Lunen, Westphalia, Germany, a German corporation
Filed Feb. 29, 1960, Ser. No. 11,839
Claims priority, application Germany Mar. 2, 1959
10 Claims. (Cl. 137—525)

The present invention relates to an excess pressure valve and more particularly to such a valve having a closure member connected to a resilient membrane and being normally urged in sealing engagement with the valve flow conduit under a predetermined force.

In conventional excess pressure valves there is generally provided a spring loaded piston carrying a valve pin which is normally urged against the valve seat in order to close the valve until a predetermined over-load pressure exerted by the fluid in the valve is reached. Accordingly, the valve is opened for passage of fluid therethrough until the fluid pressure declines below the predetermined over-load pressure. A disadvantage of such forms of construction is attributable to the fact that such valves are comparatively large and expensive especially with respect to the very costly construction involved in providing proper guiding of the valve pin into and out of closing position against the valve seat. The sealing of the piston in the housing causes additional difficulties in this respect.

Furthermore, it is known to provide excess pressure valves having elastically deformable membranes for urging the guide pistons resiliently on to the sealing surfaces of the inlet or outlet opening of the valve. These valves are comparatively complicated in structure and suffer from the disadvantages that they are neither operable with precision nor completely tight with respect to fluid flow when in closed position. This is mainly caused by the fact that the closure piston is seated flatly upon the valve opening with the result that only level surfaces rest compactly upon one another to form the fluid tight engagement. Still more objectionable in this regard is the fact that one of the sealing surfaces is generally elastically deformable and therefore subject to leakage and wear. In these valves constructions moreover a cleaning of the valve seat surfaces cannot be carried out without dismantling the valve assembly.

Another conventional form of excess pressure valve involves the use of a ring membrane for the valve opening which is closed off by a closure member displaceably inserted within the hole of the ring membrane. The closure member is provided with an annular flange, for example, which sealingly engages the rim surrounding the hole of the ring membrane under the pressure of the fluid in the valve. Where an excess pressure is exerted against the closure member and the corresponding surface of the ring membrane, the closure member is displaced in the direction of the exerted force and the membrane in turn is displaced from its normal plane. Upon displacement of the closure member a predetermined distance the same is stopped from further movement by an adjustable abutment so that upon further deflection of the membrane the opening of the valve occurs.

While such valves are easily adjustable and comparatively simple in structure, they are disadvantageously provided with level surfaces of sealing contact so that complete sealing against fluid flow is only rarely possible to obtain in operation. With the slightest deflection of the membrane ring, the flat sealing surface of the closure member is no longer in sealing contact but rather only the outer edge thereof. In this regard upon stoppage of movement of the closure member due to the presence of the adjustable abutment, the workable surface area on which the pressure of the fluid is exerted decreases by an amount equal to the workable surface area of the closure member, with the result that the force acting on the ring membrane to produce a deflection of the same is accordingly decreased. For operation therefore, a considerable increase in pressure must take place so that the membrane will be deflected to such an extent that it becomes detached from the edge of the closure member forming the seal whereby the fluid may pass through the valve. Consequently such valves inaccurately respond at pressures which are below the predetermined adjusted response pressures, and leads to the possibility of leakage in the valve within a comparatively wide range of pressure.

It is an object of the present invention to avoid the foregoing disadvantages and to provide an excess pressure valve having a closure member adapted to sealingly close an opening in the flow conduit of the valve, said closure member being connected for movement with a resilient membrane which normally urges the closure member so as to closingly seal the valve against fluid flow.

It is another object of the invention to provide an excess pressure valve which is simple in construction, inexpensive to manufacture, and durable in operation. It is still a further object of the invention to provide a valve of the above mentioned type having a single closable seal for passage of fluid through the valve.

Other and further objects of the invention will become apparent from a study of the within specification and the accompanying drawing in which FIG. 1 is a diagrammatic sectional view of an excess pressure valve in accordance with an embodiment of the invention.

In accordance with the present invention it has been found that an excess pressure valve may be provided which includes a valve housing containing a flow conduit therethrough which may be sealed by a closure member connected to a resilient membrane normally urging the closure member in sealing engagement with a portion of the conduit to close said valve. The membrane is preferably circular in shape and constructed from an elastic metal such as a spring metal having resilient characteristics. The excess pressure valve of the invention is extremely suitable for hydraulic installations wherein upon reaching a predetermined excess pressure the valve may be opened for fluid flow therethrough.

The closure member may be provided as a valve pin closing the out flow channel of the conduit in the valve housing, the valve pin preferably terminating in a conical end portion providing a rigid seal with the rim of the out flow channel when the valve is closed. Generally the valve pin is connected to the center of the circular membrane with the peripheral portion of the membrane terminating in a cylindrical collar portion concentrically disposed with respect to the valve pin and coaxially extending in the same direction therewith.

The membrane is slidably connected along the inner surface of the collar extension over a corresponding lip portion provided on the valve housing. By so seating the membrane on the housing the valve pin is maintained in urgingly sealing abutment with the out flow channel seat opening. Thus, the membrane serves simultaneously as the piston portion and spring body portion of the valve for positioning the valve pin in sealing engagement under a predetermined force.

It will be understood that the valve pin may be integrally connected with the membrane as well as provided as a separate element secured thereto. The conical surface of the valve pin is preferably smoothly executed for precise seating on the out flow channel rim.

Advantageously the collar extension of the membrane is provided at its outer end with a flange portion having a conical surface outwardly diverging from the collar portion. This conical surface suitably serves as a supporting edge for a retaining means adapted to maintain the membrane in fixed relation to the housing and to keep the valve pin in sealing abutment with the out flow channel opening. The retaining means is preferably provided as an adjustable retaining ring disposed on the housing by a threaded connection thereto. The retaining ring is provided with an inwardly extending flange portion having a corresponding conical surface on its underside for gripping engagement with the conical surface of the flange extending from the collar of the membrane. Thus by tightening the retaining ring over the flange conical portion of the membrane assembly, the membrane seal formed with the housing is improved since radially inward stresses on the collar portion against the housing are effected. The portion of the housing against which the collar of the membrane slidingly engages is suitably provided with a sealing ring disposed in an annular groove of the housing portion thereat so as to insure tight sealing engagement between the membrane collar portion and the housing. The sealing ring may take the form of a solid ring having a circular cross-section.

As an aid to the adjustment of the excess pressure valve for opening upon the attaining of a predetermined counterforce by the fluid flow, a reinforcement member is mounted upon the exterior of the membrane with regard to the valve housing. The retaining member is provided with an edge surface adapted to coact in abutting relation with the peripheral portion of the membrane at the initial portion of the collar extension provided thereon. Advantageously by positioning the reinforcement member in abutting engagement with the membrane the valve pin may be exerted under a predetermined force against the out flow channel opening whereby the retaining ring may be merely tightened by the threaded connection the desired extent. This may be accomplished without the use of tightening tools since the main force is exerted by the reinforcement member on the membrane. The retaining ring thus serves to exert radially inwardly stresses because of the conical abutment between the retaining ring and the flange of the membrane collar portion whereby the arrangement of the membrane collar and the corresponding guide surface of the housing in sealing engagement therewith is improved.

In accordance with the preferred embodiment of the invention the valve pin and membrane may be readily and easily produced in one piece, hardened and brought through grinding to the precise dimensions desired so as to insure the closing seal formed by the valve pin against the out flow channel. Due to the construction of the retaining ring, membrane, collar flange portion and sealing groove and sealing ring assembly fluid tight engagement is provided throughout the valve assembly whereby any possible leakage of fluid through these parts is avoided. The reinforcement means may be urged against the membrane under a predetermined hydraulic pressure for example, which may be adjusted as desired. In this manner the precisely correct force may be exerted on the membrane and in turn on the valve pin to set the valve such that, when the membrane is loaded in position in this manner and fixed by the retaining ring, and then the reinforcement means removed from urging engagement with the membrane, the valve will open only upon the flowing fluid reaching a pressure in excess of that so provided. It should be noted that in consequence of the initial pressure adjustment of the membrane on the housing by means of the reinforcing means, the retaining ring may be tightened in place without the need for tightening tools. This avoids the possibility that the retaining ring upon being tightened in place would engage through friction the flange portion of the membrane collar and in turn cause the membrane and the delicate cone sealing surface to be rotated as well whereby such surface might be scratched and marred. Nevertheless, after prolonged use the cone sealing surface no longer effects a secure sealing because of slight corrosion, or soiling. The same may be remedied by twisting the retaining ring and therewith the membrane and the valve cone so as to cause the cleaning of the sealing surface of the valve pin as it turns against the outflow channel opening. A single seal is therefore provided in accordance with the invention reducing to a minimum possibility of leakage through the valve whereby prolonged efficient use of the device may be made without the difficulty heretofore encountered with conventional excess pressure valve constructions.

Referring to the drawing a valve housing 1 is shown having an inlet nozzle 2 through which the pressure fluid such as a hydraulic fluid may pass along channel 3 into chamber conduit 4. The exit of the pressure fluid takes place through the centrally positioned out flow channel 5. Channel 5 is normally closed by valve pin 6. The path of fluid flow is indicated by the arrow in inlet channel 3 and out flow channel 5.

Valve pin 6 is connected to the center of membrane 7 made of a resilient metal such as an elastic or spring steel material. Pin 6 and membrane 7 may be integrally connected as one piece. The confing rim of membrane 7 is provided as a cylindrical guide collar 8 having its inside surface mounted over an upwardly extending lip portion of housing 1 having an outer surface portion. Advantageously inside surface 9 and outside surface 10 have precisely corresponding diameters so as to effect a sliding sealing engagement therebetween. The outside surface 10 of the housing lip is provided with an annular groove 12 in which is disposed a sealing ring 11 of circular cross-section which effects a further seal with the inside surface 9 of guide collar 8.

Cylindrical guide collar 8 of membrane 7 is provided on its free end portion with a flange extension 13 having an outwardly diverging conical top surface. A retaining ring 14 such as a coupling nut engages housing 1 by threaded means 15 and is provided along its upper rim portion with an inwardly extending flange having a conical surface on its underside cooperating with the conical surface of flange 13. Along the outer periphery of membrane 7 adjacent connection with guide collar 8 a flat supporting rim 16 is provided for urgingly seating reinforcement member 17 there-against along circular bearing surface 18 provided on the bottom of reinforcement member 17.

The presetting adjustment of the excess pressure valve in accordance with the invention for opening the valve in response to a specific predetermined overload pressure is carried out primarily by means of reinforcement member 17. In this connection any means for exerting a force on member 17 and in turn on membrane 7 and valve pin 6 may be used such as hydraulic pressure. Thus when the pre-setting adjustment has been completed, the retaining ring 14 tightened in place, and the reinforcement member 17 removed, the pressure fluid may flow into chamber conduit 4 and against membrane 7 which is under the predetermined pressure loading thereof by reason of the pre-setting force exerted thereagainst by reinforcement member 17 and the reference pressure means (not shown). When the pressure of the fluid in chamber conduit 4 exceeds the predetermined pressure of membrane 7 as preset by member 17 and maintained by ring 14, the desired overload pressure causes the upward displacement of membrane 7 out of its normal plane and in turn displacement of valve pin 6. In this manner the pressure fluid may flow through the opening provided and pass through out flow channel 5.

By urging membrane 7 in sealing engagement with housing 1 along collar 8 and the outer surface 10 of the housing lip by means of the reinforcement member 17, retaining ring 14 may be easily secured in place without the frictional contact with membrane 7 along the conical portion of flange 13, and accordingly without in any way scratching or marring the delicate smooth surface of valve pin 6. Retaining ring 14 therefore serves to maintain membrane 7 in fixed relation with respect to housing 1 so as to normally urge valve pin 6 in closing engagement with the opening defined by out flow channel 5.

Simultaneously by means of conical construction of the cooperating surfaces of retaining ring 14 and flange 13 a radial component of stress is effected inwardly by guide collar inside surface 9 against outside surface 10 of the housing lip in abutting engagement therewith. This dual purpose of retaining ring 14, i.e., to maintain membrane 7 in fixed relation to housing 1 and to further insure sealing engagement of guide collar 8 to the up-standing lip of the housing avoids any possible leakage of pressure fluid through the valve except under the controlled conditions of predetermined overload pressure and affords efficient and long lasting operation of the valve assembly.

What is claimed is:

1. An excess pressure valve comprising a housing, means defining a fluid flow conduit through said housing, means defining a closable opening disposed in said conduit, a closure member adapted to be moved from a position in closing contact to a position out of closing contact with said means defining said closable opening, a resilient membrane defining a portion of the wall of said conduit and being adjustably arranged on said housing for movement in its normal plane toward and away from said means defining a closable opening, said membrane including a peripheral collar portion and said conduit means including a corresponding lip portion, the inside surface of said collar portion sealingly engaging the outside surface of said lip portion for providing the wall portion defined by said membrane, said membrane having a portion adapted to be resiliently moved out of its normal plane, said closure member being connected for movement with said membrane portion and being normally urged under a predetermined force into said position in closing contact with said closable opening and being adapted to be moved out of closing contact by a predetermined counterforce exerted in said valve by fluid flowing through said conduit.

2. A valve according to claim 1 wherein said closure member is connected to the central portion of said membrane, the outer portion of said membrane being secured by said collar portion against movement out of said normal plane.

3. A valve according to claim 1 wherein said predetermined force is defined by the resilient force of said membrane.

4. A valve according to claim 1 wherein said closure member is provided with a conical bearing surface adapted to sealingly close said opening means.

5. A valve according to claim 1 wherein said membrane is circular, and the inside diameter of said collar portion and the outside diameter of said lip portion are substantially equal.

6. A valve according to claim 5 wherein the outside surface of said lip portion is provided with a sealing ring adapted to be placed in abutting engagement with the inside surface of said collar portion to seal the engagement between said collar and lip portions.

7. A valve according to claim 6 wherein said collar portion is provided with an outwardly extending flange remote from the inside surface of said collar and said housing is provided with a retaining means, said retaining means being adapted to tightly engage said flange to maintain said membrane in fixed relation to said housing.

8. A valve according to claim 7 wherein said flange is provided with an outwardly diverging conical seat and said retaining means is provided with a corresponding conical surface adapted to seatingly engage said conical seat and urge said flange and said collar portion into tight engagement with said lip portion.

9. A valve according to claim 8 wherein said housing includes means defining an annular recess the radially outer confining surface of which is formed by the inner surface of said lip portion and the radially inner confining surface of which is formed by said means defining a closable opening, said closable opening means being concentrically positioned with respect to said annular recess and flow communicating with a channel passing to the exterior of said housing, another channel passing from the exterior of the housing and flow communicating with said conduit means, said lip portion and said collar portion being circular, said retaining means being provided as a retaining ring having means thereon for adjustably retaining said flange portion and said membrane in fixed relation to said housing, said membrane being circular and peripherally terminating in said collar portion, and said closure member being fixed to the central portion of said membrane and being provided with a conical bearing surface normally urged by said membrane in sealing engagement with said closable opening means to prevent fluid flow therethrough until the counter-force of fluid flow exceeds the force of the resilient membrane normally urging said closure member in said sealing engagement.

10. A valve according to claim 9 wherein said membrane and said closure member are integrally connected.

References Cited in the file of this patent

UNITED STATES PATENTS

| 1,615,776 | Slater | Jan. 25, 1927 |
| 1,783,646 | Hajek | Dec. 2, 1930 |
| 1,838,343 | Widell | Dec. 29, 1931 |
| 2,370,939 | Cooney | Mar. 6, 1945 |
| 2,585,863 | Smith | Feb. 12, 1952 |
| 2,704,551 | Ralston | Mar. 22, 1955 |

FOREIGN PATENTS

| 14,987 | Australia | Sept. 9, 1929 |